(12) United States Patent
Ehrlich (10) Patent No.: US 6,599,664 B2
(45) Date of Patent: *Jul. 29, 2003

(54) INORGANIC GEL-POLYMER ELECTROLYTE

(75) Inventor: Grant M. Ehrlich, West Hartford, CT (US)

(73) Assignee: Yardney Technical Products, Inc., Pawcatuck, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/808,794

(22) Filed: Mar. 15, 2001

(65) Prior Publication Data

US 2001/0012590 A1 Aug. 9, 2001

Related U.S. Application Data (63) Continuation-in-part of application No. 09/137,492, filed on Aug. 21, 1998, now Pat. No. 6,203,949.
(60) Provisional application No. 60/056,740, filed on Aug. 22, 1997.

(51) Int. Cl.$^7$ ................................................ H01M 6/14
(52) U.S. Cl. ................ 429/303; 429/302; 429/304; 429/330; 429/332; 429/335; 429/326; 429/101; 429/104; 429/231.3; 429/231.1; 429/231.8; 429/231.4; 429/322

(58) Field of Search ................................ 429/303, 302, 429/304, 330, 332, 335, 326, 101, 104, 231.3, 231.1, 231.8, 231.4, 322

(56) References Cited

U.S. PATENT DOCUMENTS

| | | | | | |
|---|---|---|---|---|---|
| 5,016,991 A | * | 5/1991 | Mason | ....................... | 252/62.2 |
| 5,229,225 A | * | 7/1993 | Shackle | ....................... | 429/311 |
| 5,478,672 A | * | 12/1995 | Mitate | ....................... | 429/224 |
| 6,203,949 B1 | * | 3/2001 | Ehrlich | ....................... | 429/302 |

\* cited by examiner

*Primary Examiner*—Laura Weiner
(74) *Attorney, Agent, or Firm*—John R. Doherty (57) ABSTRACT

An anhydrous inorganic gel-polymer electrolyte is prepared using a non-aqueous sol-gel process. The inorganic gel-polymer is prepared by reacting a metal halide ($SiCl_4$) and an alcohol (tert-butyl alcohol) in a diluent solution containing a lithium salt (lithium bisperfluoroethanesulfonimide) and at least one carbonate. The resulting porous silicon oxide network encapsulates the liquid electrolyte. The gel polymer electrolyte can serve as both a separator and an electrolyte in a Li-ion cell. The material is stable and has demonstrated minimal flammability. Lithium-ion electrochemical cells made with the inorganic gel-polymer electrolyte function similarly to Li-ion cells made with a liquid electrolyte. The cells have low capacity fade, 0.69%, and low irreversible capacity, 7.6%.

14 Claims, 6 Drawing Sheets

INORGANIC GEL-POLYMER ELECTROLYTE

PRIORITY CLAIM

This application is a continuation-in-part of U.S. application Ser. No. 09/137,492, filed on Aug. 21, 1998, now U.S. Pat. No. 6,203,949, entitled "A Solid Electrolyte For An Electrochemical Cell Composed Of An Inorganic Metal Oxide Network Encapsulating A Liquid Electrolyte", which claims the benefit of Provisional application Ser. No. 60/056,740 filed Aug. 22, 1997.

GOVERNMENT RIGHTS

This invention was made with Government support under F29601-99-C-0100 awarded by the U.S. Air Force. The Government has certain rights in the invention.

BACKGROUND OF THE INVENTION

1. Field of the Invention

The present invention relates to an improved inorganic gel-polymer electrolyte and to electrochemical cells employing such an electrolyte.

2. Description of the Prior Art

The electrolyte in commercially available lithium-ion electrochemical cells is typically a solution of a lithium salt, such as $LiPF_6$ or $LiBF_4$, in a mixture of carbonate solvents, such as ethylene carbonate (EC), dimethyl carbonate (DMC), ethyl methyl carbonate (EMC) or propylene carbonate (PC). Although these liquid electrolytes are attractive as they offer good lithium ion conductivity ($10^{-3}$ S/cm), they do present certain manufacturing and safety problems. These problems arise primarily from their low viscosity, which renders the electrolytes prone to leakage, and from the volatility and flammability of the organic components, which enable the electrolytes to readily burn and vent from the cells. In cells that utilize liquid electrolytes, a microporous separator film is used to electrically isolate the positive and negative electrodes. Since solid electrolyte materials do not leak and negate the requirement for a separator film, considerable cost savings are possible.

Currently available alternatives to liquid electrolytes include ceramic, solid polymer and organic gel-polymer electrolytes. Examples of ceramic materials include lithium phosphorous oxynitride. This ceramic material conducts lithium and can act as a separator, eliminating the need for a microporous separator film. However, its low conductivity, typically $10^{-7}$ S/cm, which is over 1000 times less than liquid electrolytes and manufacturing limitations, has inhibited further development and application of this material. Solid polymer materials, such as polyethyleneoxide (PEO), and variants such as polyphenolates, offer commercially viable processing properties, and the potential for cost savings, but they must operate at elevated temperature, normally about 40° C. to about 80° C., precluding their use in many applications.

To obviate the low conductivity limitation of solid polymer materials, organic gel-polymer electrolytes have been developed. Gel-polymer materials are prepared by adding a solution of a lithium salt in an organic solvent to a solid organic polymer material. Materials using a variety of organic polymers, including (poly(vinylidene fluoride)-hexafluoropropylene (PVDF-HFP), poly(acrylonitrile) (PAN), poly(methylmethacrylate) (PMMA), poly(ethylene oxide) (PEO), poly(phosphazene) (PPz), poly(vinyl chloride) (PVC) and polytriethylene glycol(dimethacrylate) (PTGEGD), have been investigated and employed in electrochemical cells. The organic solvent and salt enable the material to offer conductivity near that of liquid electrolytes, while the polymeric matrix provides a solid structure in which the liquid electrolyte is immobilized or absorbed. While these materials mitigate leakage problems encountered with liquid materials, they do not offer any improvement in flammability and, despite considerable research and expense, they have eluded commercialization because of manufacturing, safety and scale-up problems. In the gel-polymer technology where PVDF-HFP is used as the polymer, after lamination of cell stack, a plasticizer, typically dibutylpthalate (DBP), is removed from the polymer before the electrolyte (such as EC:DMC, $LiPF_6$) is infused into the electrode stack. Some of the challenges associated with implementing this technology relate to scaling the extraction of DBP and infusion of the liquid electrolyte on a commercial scale.

In an article entitled "Synthesis and Properties of Sol-Gel Derived Electrodes and Electrolyte Materials" by J Harreld et al. appearing in "The Proceedings of the 5th Workshop for Battery Exploratory Development", published on Jun. 30, 1997, there is disclosed a solid electrolyte material which exhibits a high lithium-ion conductivity. The solid electrolyte was prepared by a known sol-gel process wherein a hydrolyzed silica precursor, namely, (tetramethyl) orthosilicate, $Si(OCH_3)_4$, was admixed with a lithium ion conducting liquid electrolyte along with deionized water and an acid catalyst to form a lithium conductive sol. The liquid lithium electrolyte was prepared by dissolving ethylene carbonate with lithium borofluorate, $LiBF_4$ in a propylene carbonate solvent to a molarity of 1.65M. After ageing and drying, Si—O—Si linkages form within the sol and a three-dimensional silicate network develops in which the liquid phase is encapsulated. The liquid electrolyte provides ionic conductivity while the silica linkages support the liquid electrolyte.

Experimentation with the solid electrolyte material disclosed in the above article has shown that the lithium borofluorate, $LiBF_4$, component in the liquid electrolyte reacts with water in the reaction mixture and is not stable. This of course precludes use of this solid electrolyte material in the fabrication of a working electrochemical cell.

A related material, using a water stable salt, was successfully demonstrated in a Li-ion cell as described in the above referred to co-pending application Ser. No. 09/137,492, filed on Aug. 21, 1998, the disclosure of which is incorporated herein by reference. These inorganic gel-polymer electrolytes are also based on the immobilization of a liquid electrolyte in an inorganic silica network. The conductivity of the dried gels is comparable to that of a liquid electrolyte, $3.5 \times 10^{-3}$ S/cm at 25° C., (EC: PC, $LiBF_4$). At 80° C. the conductivity approached $10^{-2}$ S/cm. The sol-gel process used involved the hydrolysis of a silicon alkoxide (typically silicon tetraethoxysilane (TEOS), in an aqueous solution. Although the amount of water added was limited to that required for the hydrolysis reaction, residual water accelerated capacity fade when these electrolytes were used in Li-ion ($LiCoO_2$/C) cells. All other characteristics of the cells evaluated were comparable to cells prepared with non-aqueous electrolytes. Prior efforts demonstrated that inorganic gel-polymer electrolytes of this type may be used in Li-ion cells, but to improve capacity fade the water must be eliminated.

SUMMARY OF THE INVENTION

In accordance with the present invention an anhydrous inorganic gel-polymer electrolyte material for use in electrochemical cells, and particular lithium-ion cells, is made by a non-aqueous sol-gel process. The anhydrous inorganic gel-polymer electrolyte is prepared by reacting a metal halide, preferably a metal chloride, such as silicon tetrachloride, with an alcohol, such as tert-butyl alcohol, in an anhydrous organic solvent. An active metal-ion conducting liquid electrolyte, preferably a lithium-ion electrolyte, is encapsulated into the resulting three-dimensional inorganic metal oxide polymer network. The liquid electrolyte yields good conductivity while the metal matrix imparts mechanical and thermal stability to the material. In contrast to the above described prior art, the anhydrous inorganic gel polymer electrolyte of the invention is compatible with the lithium-ion cell chemistry since it does not contain water. In addition, the inorganic gel-polymer is able to function as both an electrolyte and a separator in a lithium-ion cell.

The liquid electrolyte may be prepared by dissolving an alkali metal or alkaline earth metal salt with a suitable solvent, such as an organic solvent containing one or more carbonates. The admixture is added as a liquid precursor to an electrochemical cell employing the usual anode and cathode materials and is allowed to gel or polymerize in situ to form the inorganic solid gel-polymer electrolyte of the invention.

Thus, the invention also comprehends a novel method for fabricating an electrochemical cell employing a sol-gel electrolyte in which the electrolyte is added to the cell in its unactivated condition as a liquid and then solidifies to form a solid electrolyte, thereby enabling the manufacture of solid electrochemical cells as a liquid electrochemical system.

The lithium containing salt used in the inorganic gel polymer electrolyte of the invention is preferably an alkali metal or alkaline earth metal salt which is non-reactive with water including any one of the following organic lithium salts:

(a) Lithium Bisperfluoroethanesulfonimide ($LiN(SO_2C_2F_5)_2$)
(b) Lithium Bis[5-fluoro-2-olato-1-benzenesulfonato (2-)-O,O]borate(1-) ($LiB(C_6H_3FO(SO_3))_2$)
(c) Lithium bis-(trifluoromethanesulfonyl)imide ($LiN(SO_2CF_3)_2$)
(d) Lithium tris-(trifluoromethanesulfonyl)-methide ($LiC(SO_2CF_3)_3$)
(e) Lithium bis-(trifluoromethylsulfonyl)methane ($LiCH(SO_2CF_3)_2$ The preferred lithium salt for use in the inorganic gel-polymer electrolyte of the invention is lithium Bisperfluoroethanesulfonimide ($LiN(SO_2C_2F_5)_2$).

The solvent used to prepare the metal-ion conducting electrolyte according to the invention is preferably a solvent selected from the group consisting of ethylene carbonate, dimethyl carbonate, diethylcarbonate, ethyl methyl carbonate, methyl propylcarbonate and dimethylether as well as mixtures thereof.

The metal halide used to prepare the anhydrous inorganic gel-polymer electrolyte of the invention is preferably silicon tetrachloride ($SiCl_4$) but halides of other metals such as aluminum, titanium, vanadium, chromium, molybdenum, and tungsten may also be useful in the sol-gel process.

In addition, other alcohols besides tert-butyl alcohol may be used in the preparation of the inorganic gel-polymer electrolyte of the invention as will readily occur to those skilled in the art.

The electrochemical cell according to the invention may employ any conventional anode material but preferably the anode is carbon. Other anode materials that may be used include lithium, titanium oxide, tin oxide, tin or germanium oxide, for example. Similarly, the cathode material may be any conventional cathode material but preferably is a lithiated transition metal oxide such as lithium cobalt oxide $LiCoO_2$. Other suitable cathode materials include $LiNiO_2$, $LiNi_{0.82}Co_{0.18}O_2$ and $LiMn_2O_4$, for example.

BRIEF DESCRIPTION OF THE DRAWINGS

The invention will now be described in greater detail in the following description of the preferred embodiments thereof taken in conjunction with the accompanying drawings wherein.

In the above description of the drawings and hereinafter, the double slant line notation "//" represents phase boundaries whose potential is regarded as negligible.

DESCRIPTION OF THE PREFERRED EMBODIMENTS

The invention comprehends the preparation of an anhydrous inorganic gel-polymer electrolyte and separator or both utilizing the sol-gel process but in which the electrolyte material is prepared under non-aqueous conditions. The following description will be limited to one type of electrolyte and electrochemical cell, namely, a lithium-ion conducting electrolyte and a lithium-ion electrochemical cell but it will be understood that the invention may be applicable to other electrolyte and cell systems as will occur to those skilled in the art.

The anhydrous inorganic gel-polymer of the invention may be prepared by the reaction of silicon tetrachloride and an alcohol, such as tert-butyl alcohol, to yield silica, HCl and chlorobutane. The overall reaction is described by the following equation:

SiCl$_4$+4t-C$_4$H$_9$OH→SiO$_2$+4HCl+4t-C$_4$H$_9$Cl

This reaction occurs under a wide range of conditions including various reactant concentrations, electrolyte mixtures, and temperature. The reactant concentrations used in the initial experiments ranged from about 0.1M to a concentrated 4M. Various mixtures of plasticizing agents were also used. Additionally, the inorganic gel-polymer was coated onto different electrode and separator materials. The gels prepared in these experiments included very liquid, soft and soft lumpy gels. However, soft semi-firm or solid gels were also prepared which performed well when used in lithium-ion cells.

A preferred procedure that yielded electrolyte material with good mechanical strength, gel consistency, good conductivity and a cure time of 2–3 hours, is described below. All synthetic procedures were performed in an argon filled glove box with anhydrous reagents used as received from the manufacturer, unless otherwise mentioned. The lithium bisperfluoroethanesulfonimide salt (BETI) used in the experiments was dried at 100° C. under vacuum for three days. The reactions were carried out at room temperature in 60 mL polyethylene vials.

A liquid electrolyte solution was used as the diluent in the polymerization reaction. To form the liquid electrolyte solution, lithium bisperfluoroethanesulfonimide salt (LiN (SO$_2$C$_2$F$_3$)$_2$, 3.004 g, 7.76 mmol) was dissolved in 7.76 mL of a 1:3 (v/v) EC:EMC solution. Next, tert-butanol (t-BuOH, 1.6 mL, 17.5 mmol), diluted in 3.33 mL of liquid electrolyte, was added to a vial containing silica tetrachloride (SiCl$_4$, 0.573 mL, 5 mmol), and 4.43 mL of liquid electrolyte. The mixture was gently stirred for five minutes and then coated onto negative electrode material by dipping the electrode into the unpolymerized mixture. The coated electrode was then heated to 100° C. After the coated electrode appeared dry by eye, typically 10–15 minutes, the coating process was repeated by dipping the negative electrode into the inorganic gel-polymer solution and heating. Typically, five (5) coats of inorganic gel-polymer were applied. In some cases, a glass fiber separator was coated instead of the negative electrode material; the same procedure was followed. Complete polymerization of the bulk material occurred within three hours of mixing.

The product of this synthesis is a SiO$_2$ network that immobilizes a solution of a lithium salt in a carbonate solvent. A possible reaction scheme for this non-aqueous sol-gel process is shown below.

where (R = t-C$_4$H$_9$)

As seen above, the polymerization is initiated by a nucleophilic substitution of the Cl atom in silicon tetrachloride by the oxygen in the tert-butanol. The resulting compound, SiCl$_3$OR, can then nucleophilically substitute a Cl atom on another SiCl$_4$ molecule. This reaction repeats until there is a Si—O network.

The optimal stoichiometric ratio of SiCl$_4$ to t-BuOH and the concentration of the reagents in the diluent solvent was also investigated. It was found that if 1M SiCl$_4$ and 3.5M BETI is used in the stoichiometric ratio of 1:3.5 to 1:4, high quality, homogeneous gels are formed in 3 hours. Use of concentrated solutions of SiCl$_4$ and t-BuOH result in a highly exothermic reaction and an anhydrous solid inorganic polymer. Lower concentrations of reactants generally yielded softer gels with a longer cure time.

Three different salts, LiPF$_6$, LiBF$_4$ and BETI were used in this synthesis. The salts LiPF$_6$ and LiBF$_4$ precipitated out of solution during the polymerization reaction; however, BETI remained in solution throughout the process.

Different solvent mixtures were used to make the liquid electrolyte solutions, including ethyl methyl carbonate, a 1:3 EC:EMC mixture and a 1:5 EC:EMC mixture. No significant difference in the inorganic gel-polymer characteristics or the electrochemical performance was observed when these plastisicing agents were used.

One of the limitations of this polymerization reaction is the production of HCl gas. Electrodes containing cobalt and copper reacted with the hydrochloric acid. The positive electrode material, LiCoO$_2$ on Al, and a negative electrode material, graphite on Cu, were observed to degrade when coated with the inorganic gel-polymer electrolyte. However, the negative electrode material, graphite on nickel, was observed to be compatible with the inorganic gel-polymer electrolyte. Further it was found that heating the coated graphite on nickel electrode removed the HCl from the material. Therefore, this type of electrode was used in the cells described below.

Images were obtained on a scanning electron microscope and showed the surface characteristics of the inorganic gel-polymer coated negative electrode material. A SEM micrograph of an uncoated negative electrode showed approximately 25 um carbon spheres while a similar micrograph of a coated electrode showed the inorganic gel-polymer covering the carbon spheres with a thin homogeneous coating.

To test the ability of the inorganic gel-polymer silica matrix to decrease the flammability of a carbonate electrolyte, five (5) grams of the material was synthesized and presented with an open gas flame. The inorganic gel-polymer did not ignite and the silica matrix greatly reduced the volatility of the encapsulated liquid electrolyte. When the flame was held directly on the material for a prolonged period, the material did combust slowly.

Voltammetic and galvanistatic experiments were performed on electrochemical cells containing the anhydrous inorganic gel-polymer electrolyte of the invention. An Arbin BT-2043 instrument was used to perform the electrochemical tests. Cells were made using 2325 coin cell hardware (dia. 22.5 mm and 2.5 mm thick) with a stack pressure of 20 lbs. During initial evaluations, the inorganic gel-polymer was coated onto S&S #30 glass fiber paper.

Figure 1:
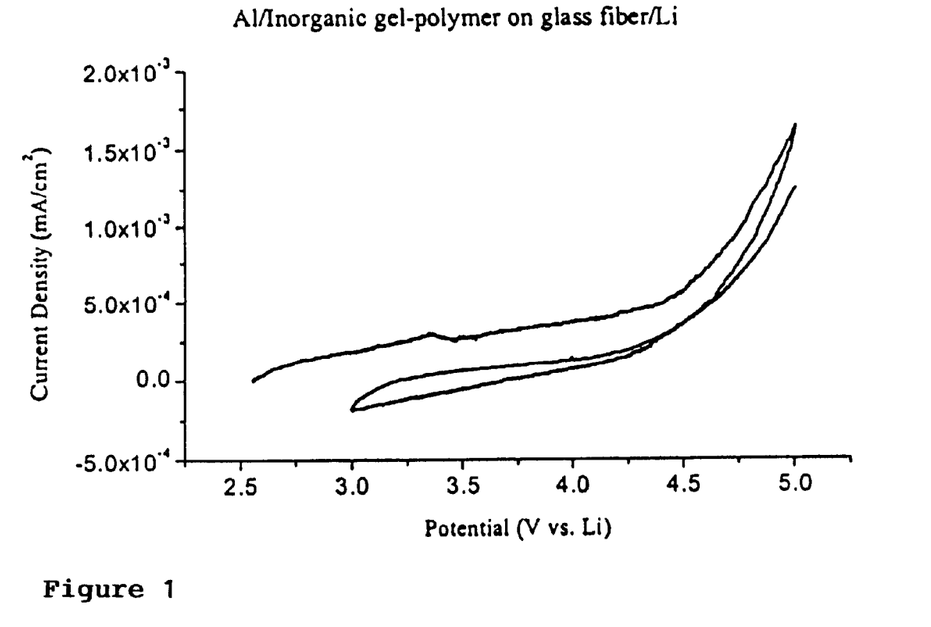
FIG. 1 is a curve showing current density vs. potential of a blocking electrode cell employing an aluminum positive electrode, a Li negative electrode and an inorganic gel-polymer electrolyte according to the invention.

Voltammetry was used to demonstrate that the inorganic gel-polymer electrolyte was stable over the range of potential required for lithium-ion cells, 0V to 4.5V vs. Li. To evaluate the stability of the polymer at high potentials (3V to 5V vs. Li) a blocking electrode cell was used. This cell incorporated an aluminum positive electrode, the inorganic gel-polymer coated on glass fiber paper, and a lithium negative electrode. The stability of the material at high potential is illustrated in the voltammogram shown in FIG. 1. Below 4.5V the current density is small, less than $6.5 \times 10^{-4}$ mA/cm$^2$, demonstrating the stability of the materials and the minimal amount of cell corrosion or electrolyte degradation present.

Figure 2:
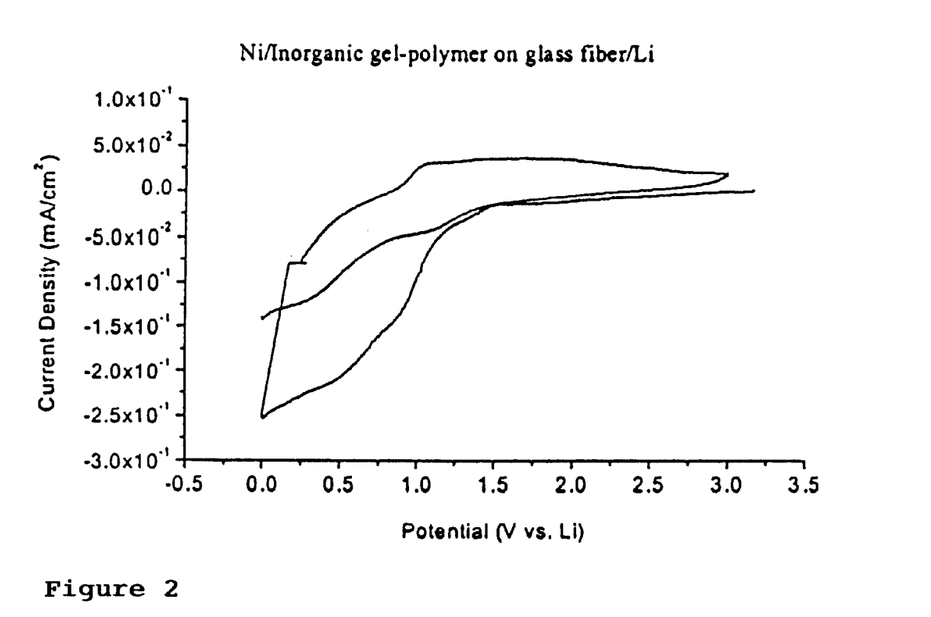
FIG. 2 is a curve showing current density vs. voltage of a blocking electrode cell employing a Li coated nickel electrode and an inorganic gel-polymer electrolyte according to the invention.

To evaluate the stability of the inorganic gel-polymer below 3V vs. Li, lithium was plated onto a nickel electrode using the inorganic gel-polymer electrolyte on glass fiber sheet. In this case, Li was reversibly plated and stripped from the nickel electrode. As shown in the voltammogram in FIG. 2, some hysteresis is observed in this process between 1.25 and 0V on the first reduction. On the second scan the current density between 1.25 and 0V is reduced. The process observed below 1V on the first scan may be the formation of a passivation layer on the nickel electrode as suggested by the lower current density observed on the second scan.

Figure 3:
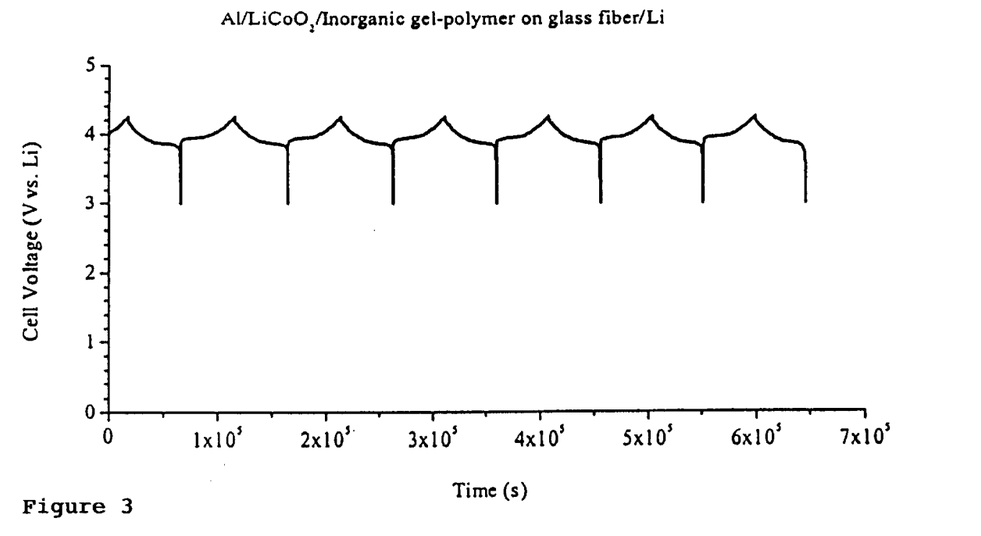
FIG. 3 is a curve showing cell voltage vs. time of a blocking electrode cell employing a $LiCoO_2$ positive electrode, a lithium negative electrode and an inorganic gel-polymer immobilized within a glass fiber sheet and cycled between 3.0 and 4.25 vs. Li at 0.2 mA/cm$^2$.
Figure 4:
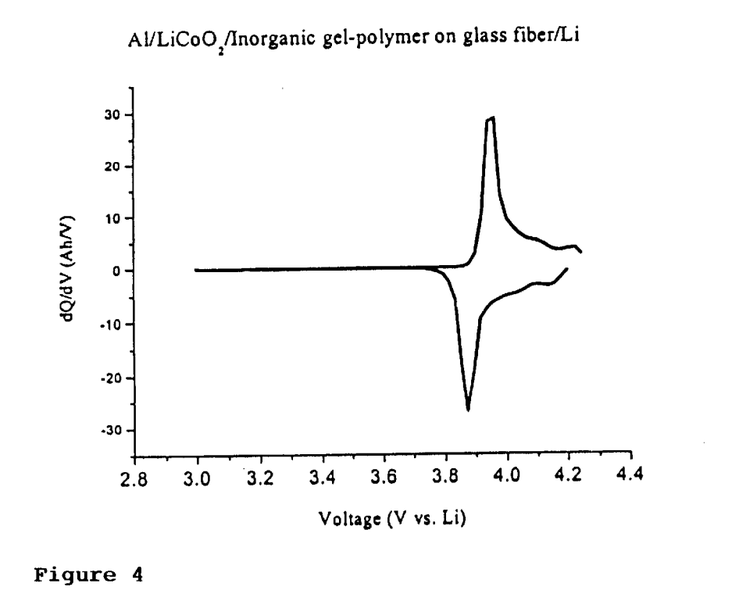
FIG. 4 is a curve showing the dQ/dV vs. voltage for the first charge/discharge cycle of a $LiCoO_2$/inorganic gel-polymer embedded in a separator/Li cell.
Figure 5:
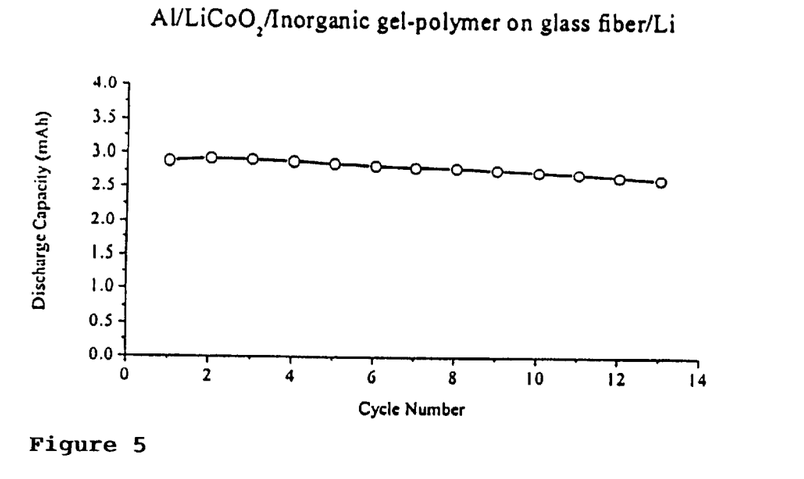
FIG. 5 is a curve showing the discharge capacity vs. cycle number for a Al/$LiCoO_2$/inorganic gel polymer on separator/Li//Ni cell cycled at 0.2 mA/cm$^2$ on charge and discharge at 25° C.
Figure 6:
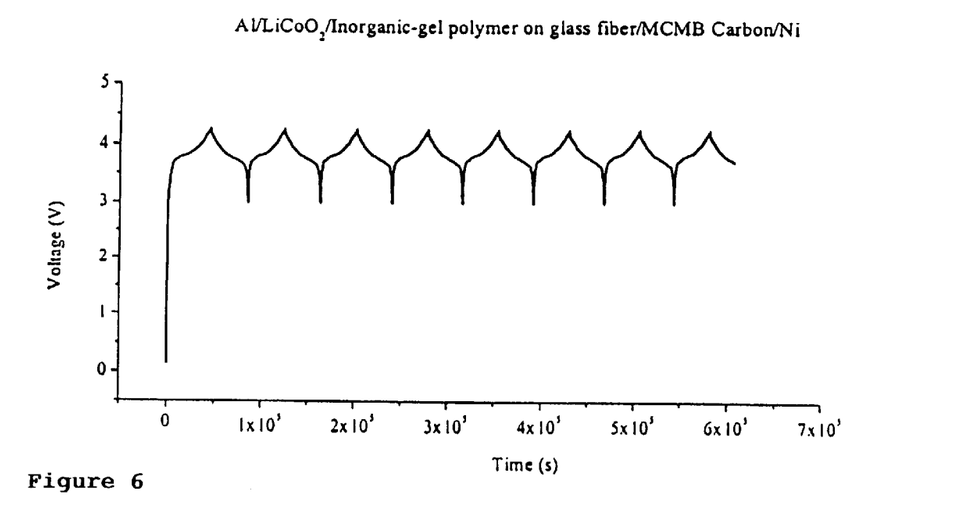
FIG. 6 is a curve showing voltage vs. time for a Al/$LiCoO_2$/inorganic gel polymer on separator/MCMB carbon/Ni cell.
Figure 7:
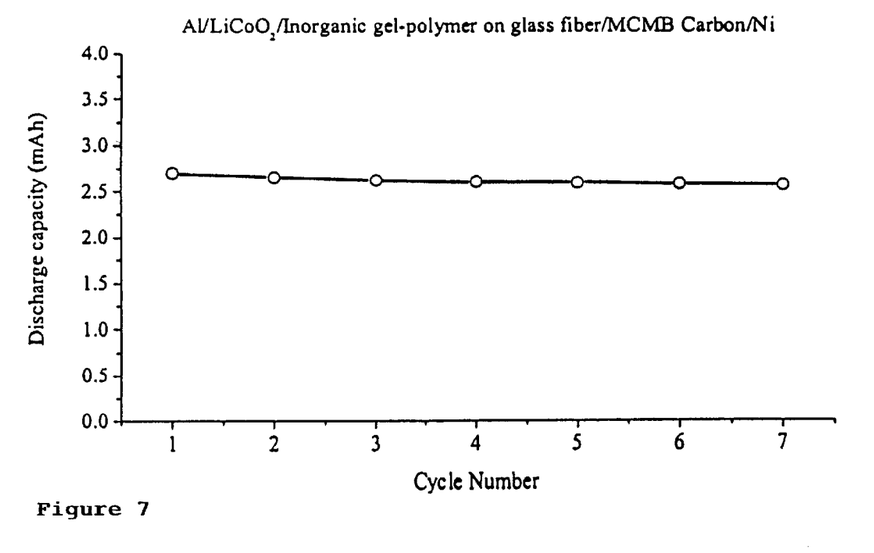
FIG. 7 is a curve showing discharge capacity vs. cycle number for the same Li-ion cell as in FIG. 6.

To illustrate the chemical compatibility of the inorganic gel-polymer electrolyte with LiCoO$_2$ in an electrochemical cell, a cell was fabricated where the positive electrode was LiCoO$_2$, the negative electrode was lithium, and the inorganic gel-polymer was immobilized within glass fiber sheet that separated the positive and negative electrodes. The cell was cycled between 3.0V and 4.25V vs. Li at 0.2 mA/cm$_2$. A plot of the cell voltage vs. time is shown in FIG. 3. These charge and discharge curves illustrate that the cell could be repeatably charged and discharged without significant degradation, thus the cell components, including the inorganic gel-polymer electrolyte, are stable in these conditions. As illustrated in FIG. 4, a plot of dQ/dV versus voltage for the first cycle, the cell potential is characteristic for a LiCoO$_2$/Li cell and the charge/discharge process is highly reversible. A voltage plateau occurs at 3.95V vs. Li on charge and 3.87V vs. Li on discharge. Additionally, as illustrated in FIG. 5, these materials have demonstrated low capacity fade, 0.69% per cycle over 14 cycles.

Figure 8:
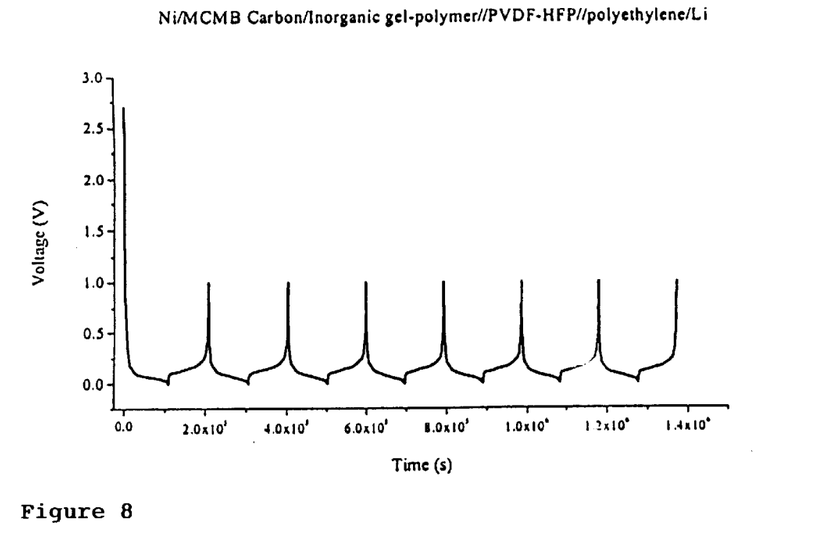
FIG. 8 is a curve showing voltage vs. time for a Ni/MCMB/inorganic gel-polymer/PVDF-HFP/separator/Li cell when cycled between 1V and 0V vs. Li at 0.1 mA/cm$_2$.
Figure 9:
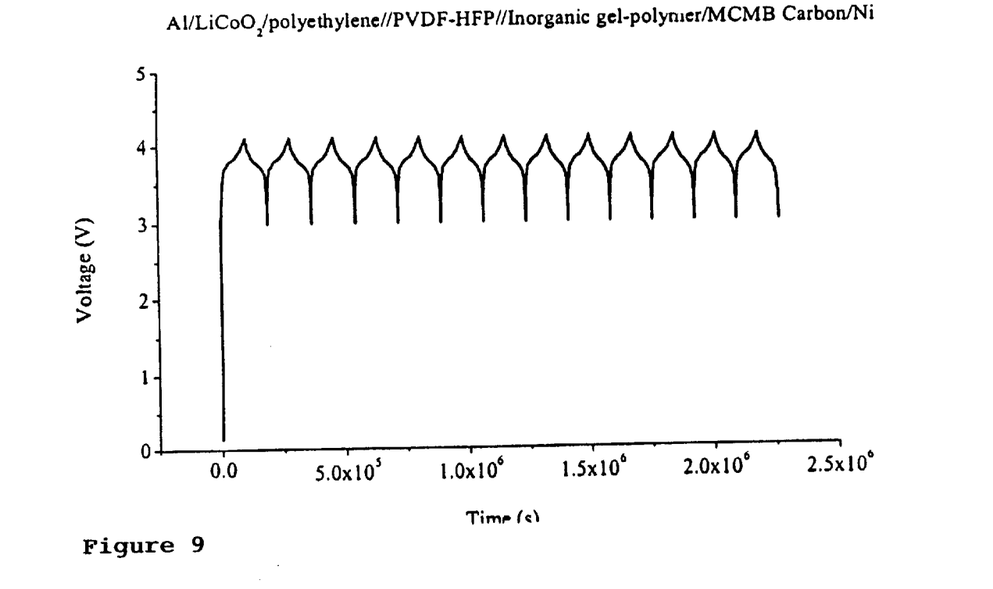
FIG. 9 is a curve showing voltage vs. time of a Li-ion cell employing $LiCoO_2$/polyethylene//PVDF-HFP//inorganic gel-polymer/MCMB carbon//Ni when cycled between 3V and 4.1V at 0.1 mA/cm$_2$.

To further demonstrate the viability of the inorganic gel-polymer electrolyte of the invention, a cell was fabricated incorporating a LiCoO$_2$ positive electrode, a MCMB 25–28 carbon negative electrode and a microporous polyethylene separator on which the inorganic polymer electrolyte was immobilized. The cell was cycled between 3.0 and 4.25V at 0.25 mA/cm$^2$. FIG. 8 shows the cell voltage over eight cycles, indicating that the inorganic gel-polymer electrolyte is chemically compatible with electrode materials, carbon and LiCoO$_2$. The irreversible capacity on the first cycle for this cell was 0.462 mAh or 14.6%, comparable to that typical for Li-ion cells. A plot of discharge capacity over 7 cycles is shown in FIG. 9. As shown, the discharge capacity dropped from 2.698 mAh to 2.575 mAh over the seven cycles, thus a fade rate of 0.65% per cycle.

An attractive feature of the inorganic gel-polymer electrolyte is that it can be coated onto the negative electrode material used in Li-ion cells. This feature is expected to enable the manufacture of lower cost Li-ion cells. To demonstrate the ability of electrodes coated with the inorganic gel-polymer to reversibly incorporate lithium, coated negative electrodes were cycled versus lithium in a (Ni//MCMB)/inorganic gel-polymer//PVDF-HFP//polyethylene/Li) cell between 1V and 0V at 0.1 mA/cm$^2$. As illustrated in FIG. 8, the coated negative electrode intercalated and deintercalated lithium at potentials typical for carbon and desirable for Li-ion cells; the irreversible capacity was 7.6%.

Figure 10:
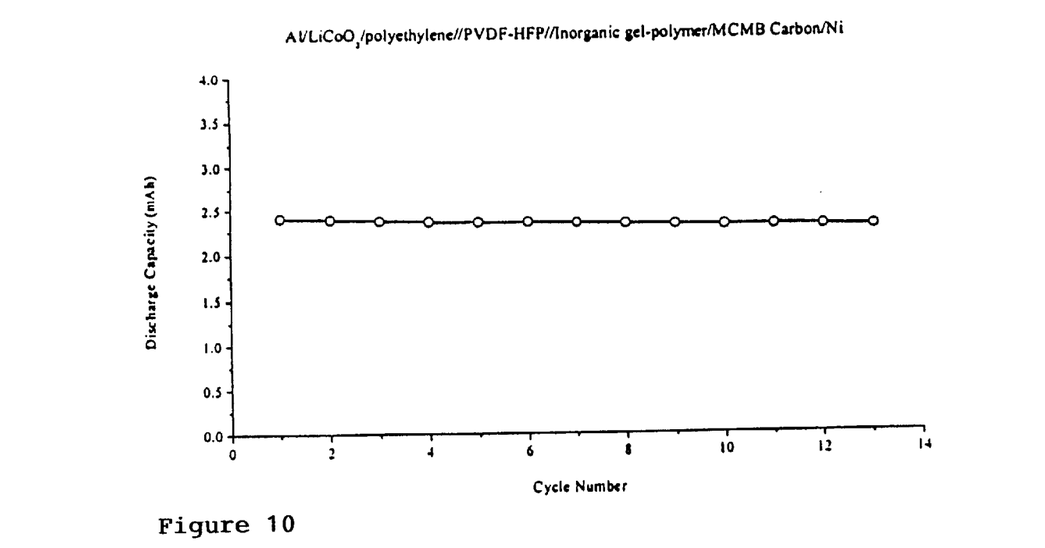
FIG. 10 is a curve showing discharge capacity vs. cycle number for a Li-ion cell employing Al/LiCoO/PVDF-HFP//polyethylene//inorganic gel-polymer/MCMB carbon//Ni when cycled between 3V and 4.1V at 0.1 mA/cm$^2$.
Figure 11:
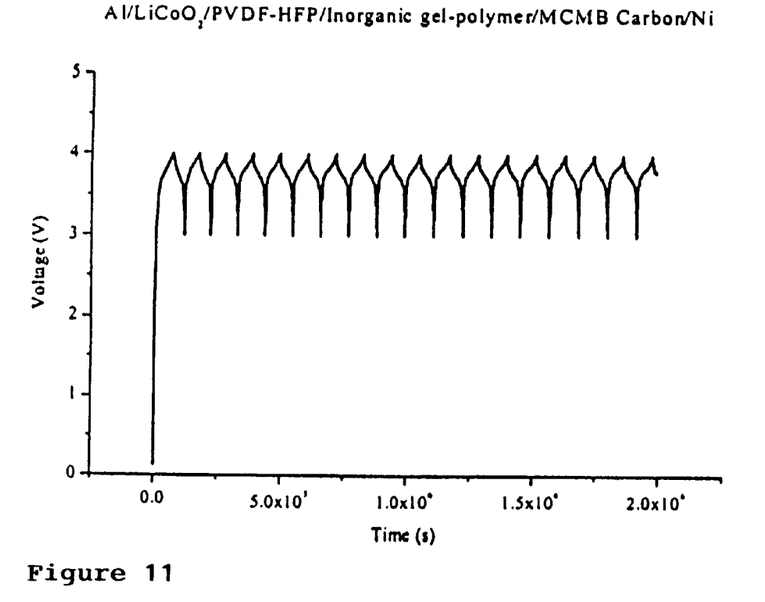
FIG. 11 is a curve showing voltage vs. time for a LiCoO/MCMB carbon cell employing an inorganic gel-polymer as both electrolyte and separator cycled at 0.25 mA/cm$^2$ between 3.0V and 4.0V.

To demonstrate the viability of a MCMB electrode coated with the inorganic gel-polymer material in a Li-ion cell, a (Al//LiCoO$_2$/PVDF-HFP//polyethylene//Inorganic gel-polymer coated on MCMB Carbon//Ni) cell was fabricated. The cell was cycled between 3V and 4.1V at 0.1 mA/cm$^2$ as shown in FIG. 11 for 13 cycles. As shown, the potential and capacity of the cell were stable. Over the thirteen cycles shown in FIG. 10, the capacity fade rate was 0.35% per cycle, thus it can be concluded that the negative electrode coated with the inorganic gel-polymer functions in the same manner as a non-coated negative electrode.

Figure 12:
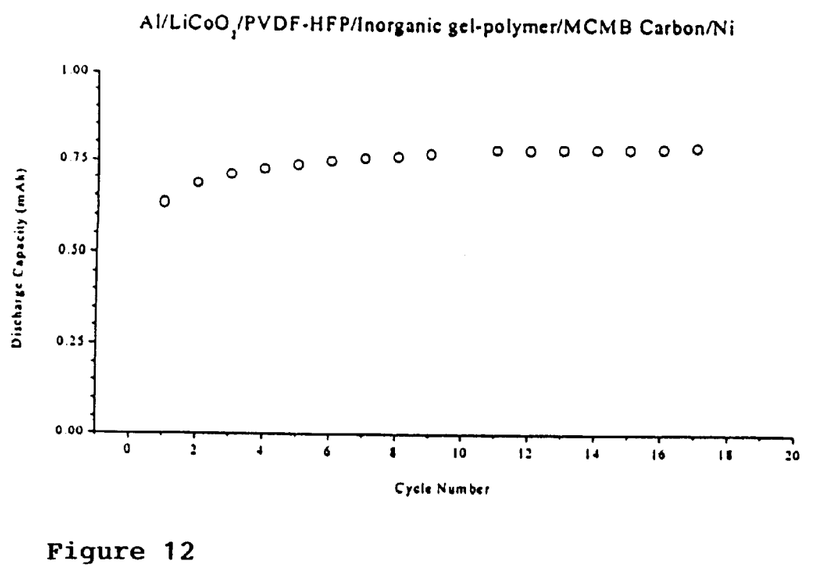
FIG. 12 is a curve showing discharge capacity vs. cycle number for a Li-ion cell employing Al/$LiCoO_2$/PVDF-HFP//inorganic gel-polymer/MCMB carbon//Ni cycled at 0.25 mA/cm$^2$ between 3.0V and 4.0V and in which the edges of the electrodes were electrically isolated by an insulating gasket.

In the cells described above, a microporous polyethylene film or glass fiber separator were incorporated into the cell to serve as an electrical separator between the positive and negative electrodes. To demonstrate the ability of the inorganic gel-polymer material to serve as both the electrolyte and separator in a cell, a cell was constructed in which only the inorganic gel-polymer material, coated onto the negative electrode, separated the positive and negative electrodes of the cell. In this cell, (Al//LiCoO$_2$/PVDF-HFP//Tefzel® gasket/inorganic gel-polymer/MCMB//Ni), a Tefzel® gasket or doughnut was used to insulate the edges of the negative electrode from the positive cell cover. Due to edge effects, the polymer coating was thinner and less consistent around the perimeter of the negative electrode. The voltage of the cell, which was cycled at a rate of 0.25 mA/cm$^2$ between 3.0V and 4.0V, is shown in FIG. 11. As illustrated, the cell capacity and voltage were stable as it was charged and discharged seventeen times. The irreversible capacity for the first cycle is 33%. As shown in FIG. 12, the capacity of the cell increased as it was cycled.

What is claimed is:

1. An electrolyte for an electrochemical cell comprising: an anhydrous gel-polymer composed of a three-dimensional inorganic metal oxide network encapsulating a liquid electrolyte solution containing a water stable salt and an organic solvent.

2. An electrolyte according to claim 1, wherein the inorganic network is composed of an oxide of a metal selected from the group consisting of aluminum, silicon, titanium, vanadium, chromium, molybdenum and tungsten.

3. An electrolyte according to claim 1, wherein the inorganic network is composed of silica.

4. An electrolyte according to claim 1, wherein the salt is an alkali metal or alkaline earth metal salt which is stable in the presence of water.

5. An electrolyte according to claim 4, wherein the salt is an organic lithium salt selected from the group consisting of lithium bisperfluoroethanesulfonimide, lithium bis[5-fluoro-2-olato-1-benzenesulfonato(2-)-O,O]borate(1-), lithium bis-(trifluoromethanesulfonyl)imide, lithium tris-(trifluoromethanesulfonyl) -methide, and lithium bis-(trifluoromethylsulfonyl)methane.

6. An electrolyte according to claim 4, wherein the salt is lithium bisperfluoroethanesulfonimide.

7. An electrolyte according to claim 1, wherein the organic solvent is selected from the group consisting of ethylene carbonate, dimethyl carbonate, diethylcarbonate, ethyl methyl carbonate, methyl propylcarbonate and dimethylether and mixtures thereof.

8. An electrochemical cell comprising an anode, a cathode and an electrolyte disposed therebetween, said electrolyte comprising an anhydrous gel-polymer composed of a three-dimensional inorganic metal oxide network encapsulating a liquid electrolyte solution containing a water stable salt and an organic solvent.

9. An electrochemical cell according to claim 8, wherein the anode is composed of carbon.

10. An electrochemical cell according to claim 8, wherein the cathode is composed of a lithiated transition metal oxide.

11. An electrochemical cell according to claim 10, wherein the cathode is composed of $LiCoO_2$.

12. An electrochemical cell according to the claim 8, wherein the inorganic network is composed of silica.

13. An electrochemical cell according to claim 8, wherein the salt is an organic lithium salt selected from the group consisting of lithium bisperfluoroethanesulfonimide, lithium bis[5-fluoro-2-olato-1-benzenesulfonato(2-)-O,O]borate (1-), lithium bis-(trifluoromethanesulfonyl)imide, lithium tris-(trifluoromethanesulfonyl)-methide, and lithium bis-(trifluoromethylsulfonyl)methane.

14. An electrochemical cell according to claim 8, wherein the salt is lithium bisperfluoroethanesulfonimide.

* * * * *